UNITED STATES PATENT OFFICE.

ROBERT MARCHAND, OF AMSTERDAM, NETHERLANDS.

PROCESS FOR THE PREPARATION OF TERPINEOL.

1,408,462. Specification of Letters Patent. Patented Mar. 7, 1922.

No Drawing. Application filed December 8, 1920. Serial No. 429,249.

*To all whom it may concern:*

Be it known that I, ROBERT MARCHAND, a subject of the Queen of the Netherlands, residing at Amsterdam, in the Province of North Holland, in the Kingdom of the Netherlands, have invented certain new and useful Improvements in or Relating to a Process for the Preparation of Terpineol, (for which I have filed an application in the Kingdom of the Netherlands Nov. 10, 1919;) and I do hereby declare that the following is a full, clear, and exact description of the same.

The common method of preparing terpineol from hydrate of terpine consists in boiling this latter with phosphoric or sulfuric acid. In this process a mixture is always obtained of terpineol with terpinolene. The output of terpineol is at most 65% and the terpinolene is a by-product of little value, the separation of which necessitates a complication of the process.

It has now been found that by substituting for phosphoric or sulfuric acid organic sulfonic acids, the output of terpineol is considerably bettered. Excellent results are obtained with quinoline-sulfonic-acid. By using this acid the output becomes nearly theoretical, which enables a considerable simplification of the process. It becomes possible thereby to introduce the hydrate of terpine continually into the reaction mixture and to distill off an equivalent quantity of terpineol.

I claim as my invention:—

1. A process of preparing terpineol, consisting in boiling hydrate of terpine with an organic sulfonic acid; substantially as described.

2. A process of preparing terpineol, consisting in boiling hydrate of terpine with quinoline sulfonic acid; substantially as described.

3. A process of preparing terpineol, consisting in boiling a mixture of hydrate of terpine and quinoline sulfonic acid; continuously introducing fresh hydrate of terpine into the boiling mixture; and distilling off quantities of terpineol equivalent to the hydrate of terpine introduced; substantially as described.

In testimony whereof I hereunto affix my signature, in the presence of two witnesses.

ROBERT MARCHAND.

Witnesses:
 H. Y. KUYFERL,
 H. SHANGARDYK.